United States Patent [19]
Thorne

[11] 3,726,129
[45] Apr. 10, 1973

[54] SYSTEM FOR MEASURING THE RESONANT FREQUENCY OF A BODY

[75] Inventor: Ernest Alexander Thorne, Winfrith, England

[73] Assignee: United Kingdom Atomic Energy Authority, London, England

[22] Filed: Nov. 16, 1970

[21] Appl. No.: 89,667

[30] Foreign Application Priority Data

Nov. 25, 1969 Great Britain.....................57,729/69

[52] U.S. Cl..................................73/67.2, 73/339 A
[51] Int. Cl............................................G01n 29/00
[58] Field of Search..................73/339 A, 67.2, 67.5

[56] References Cited

UNITED STATES PATENTS

| | | | |
|---|---|---|---|
| 3,399,570 | 9/1968 | Pirlet | 73/339 |
| 3,595,069 | 7/1971 | Fowler | 73/67.2 |
| 3,214,977 | 11/1965 | Apfel | 73/339 |
| 3,621,453 | 11/1971 | Ringwall et al. | 73/339 A |

Primary Examiner—Richard C. Queisser
Assistant Examiner—Arthur E. Korkosz
Attorney—Larson, Taylor and Hinds

[57] ABSTRACT

Various physical characteristics of a solid body are dependent upon its natural frequency of vibration and the invention describes a method whereby a body may be excited to resonance through the operation of a remote transducer, and once resonance is achieved it may be preserved, even though the value thereof alters. By measuring the variations in resonance, environment conditions, such as temperature, may be deduced.

7 Claims, 12 Drawing Figures

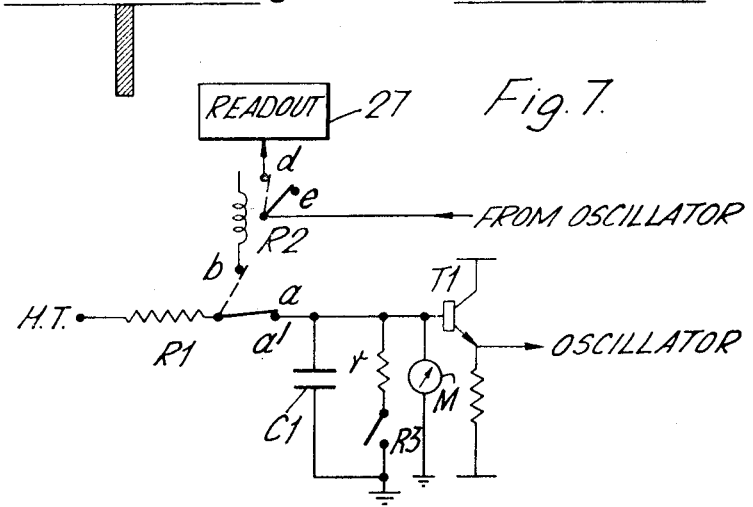

SYSTEM FOR MEASURING THE RESONANT FREQUENCY OF A BODY

BACKGROUND OF INVENTION

This invention relates to a system for monitoring the resonant frequency of a body, that is to say a system for yielding a continuous, if necessary, indication of the natural frequency of vibration of a body as and when that frequency changes. The interest in monitoring frequency in this context arises in the main from the advantage to be gained by using this parameter as an indication of temperature as explained in U.S. Pat. Serial No. 685,880.

In the said specification a means is described of exciting a discrete terminal portion of a long probe to resonance by injecting short bursts of oscillations, sonic or ultrasonic, into a portion of the probe remote from said terminal portion. Accordingly, the resonant frequency of the said portion could be ascertained by launching short burst of waves into the probe the frequency of the waves in each successive burst being different until the echoes indicated that the terminal portion was at resonance.

The present invention aims to provide means whereby once the resonant frequency has been detected the frequency of the injected oscillations is either maintained at resonance or follows changes in the natural frequency of a discrete part of the probe.

SUMMARY OF INVENTION

The invention comprises therefore the concept of launching bursts of elastic waves into a transmission line leading to a probe, examining the reflections from a discrete portion thereof, varying the frequency of the waves in successive bursts until the reflections indicate that the frequency of a given burst is the resonant frequency of the said discrete portion, and maintaining the transmission at the resonant frequency of the said portion even though that frequency should change due to extraneous influence such as temperature changes. Since the resonant frequency is a temperature dependent, this frequency can be used to obtain a measure of the temperature of the resonator.

According to the invention a system for monitoring the resonant frequency of a body comprises a transducer operative firstly, in response to an electrical input to cause elastic waves of variable frequency to be transmitted into said body and secondly, in response to echoes of said waves, (to yield corresponding electrical outputs) from a discrete region of the body adapted to provide a different echo pattern in response to transmitted waves at the "on" and "off" resonance frequency, a detector responsive to the change in echo pattern from said discrete region, means extracting a control signal from the response of the detector and applying the control signal to the transducer in a manner tending to maintain the frequency of the transmitted signals at the resonant frequency.

By using a frequency dependent parameter of the transmitted signals at resonance, an indication of temperature may be obtained. In the application of sonic waves at resonant frequency into a transmission line leading, through a region of sonic mismatch, to the body, it is noted that the echoes received can be made to exhibit a number of cycles of decreasing amplitude, followed by a change in phase and followed immediately by a number of cycles of increasing amplitude. The present invention resides in extracting an electrical signal from the portion of the echo signal at resonance between the cycles of increasing amplitude and those of decreasing amplitude and using this electrical signal to maintain the frequency of waves applied to the body at the resonant frequency.

DESCRIPTION OF THE DRAWINGS

In order that the invention may be better understood, embodiments thereof will now be described with reference to the accompanying diagrammatic drawings in which FIG. 1 also indicates at A to H the signals present in various parts of the system in the at resonance and out of resonance conditions.

FIGS. 3a, 4a, 5a and 6a illustrate signals present in the system shown in FIG. 2 when the probe is in the resonance condition.

FIGS. 3b, 4b, 5b, and 6b illustrate the corresponding signals in the out of resonance condition;

FIG. 7 shows a form of electrical circuit for controlling the frequency of the transmitted waves; and FIG. 8 is a diagram illustrative of the operation of the circuit of FIG. 7.

DESCRIPTION OF THE PREFERRED EMBODIMENTS

Figure 1:
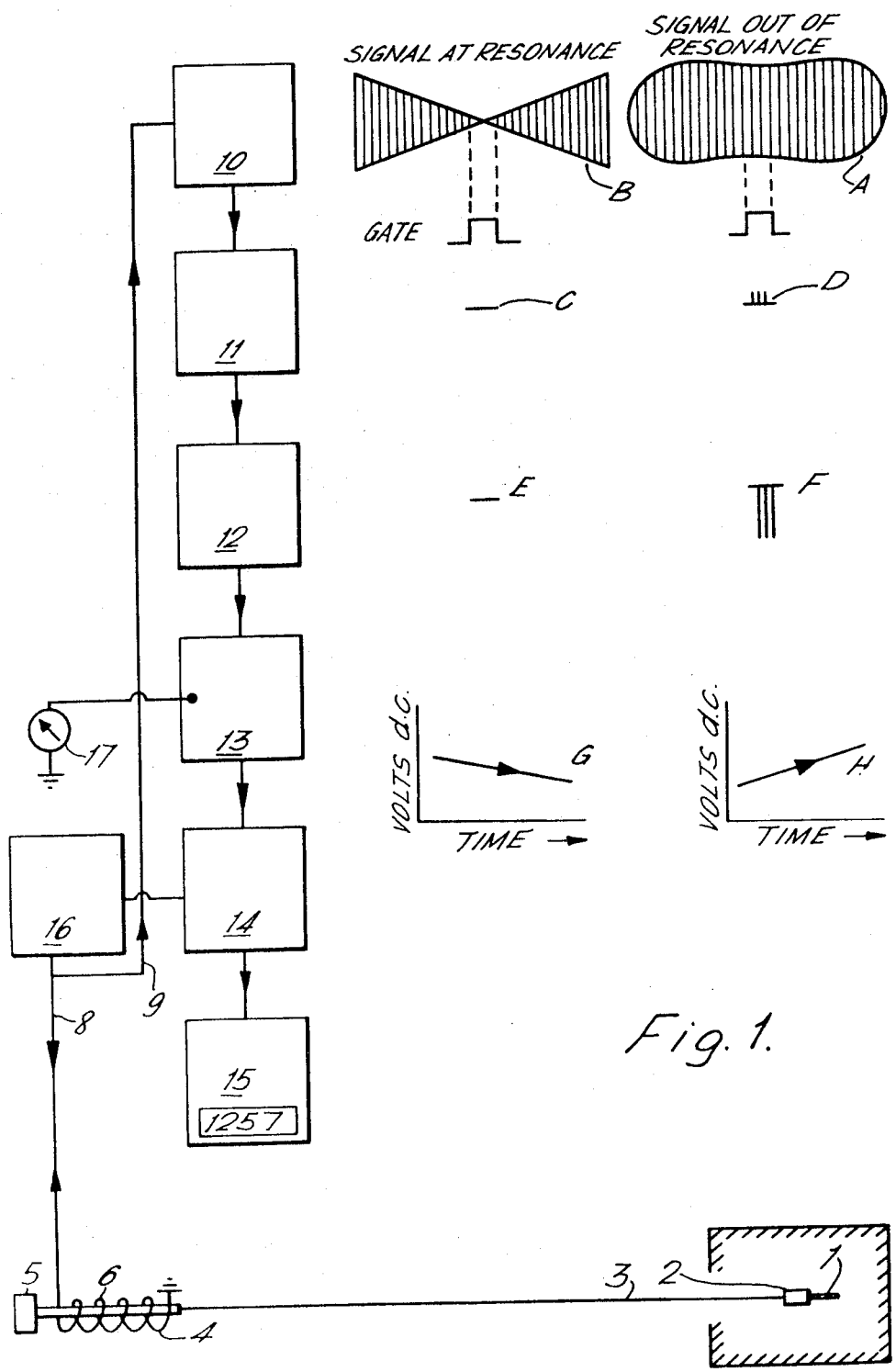
FIG. 1 is a diagram of temperature measuring system employing a system for monitoring the resonant frequency of a probe whose natural frequency of vibration is temperature dependent, whereby a measure of probe temperature is obtained.

In FIG. 1 a temperature sensor 1 is a short length of molybedenum wire about 1 centimeter long 1 mm diameter which is joined to a small solid cylinder 2 of the same material. The cylinder 2 is joined to a transmission wire 3 of molybedenum and constitutes an acoustic mismatch between the wire 3 and the cylinder 2. The wire 3 is connected to a magnetostrictive rod 4 which is polarised by a permanent magnet 5 mounted at the fixed end of the rod. A single coil 6 surrounds the rod 4 and is connected to a source of electrical pulses of variable frequency. The parts 4, 5 and 6 constitute a transducer, the parts 1, 2 and 3 a probe. In response to an electrical input to the coil 6, the ultrasonic waves travel along the rod 4 into the wire 3 to the sensor 1, the waves being transmitted in bursts of variable frequency and finite duration. Echoes from the sensor 1 travel back along the wire and themselves effect electrical oscillations in the coil 6. So far the device operatessubstantially in accordance with the description given in out Patent No. 1,146,520 and, as explained therein, the echoes received back from the sensor are of the same frequency as the transmitted signal. As the frequency of the latter is changed and eventually coincides with the resonant frequency of the sensor, the echo signal changes markedly to the characteristic form shown at B. This includes a signal of reducing amplitude followed by a change in phase, or null point, and a portion of increasing amplitude. The portion of the probe which gives rise to the phase change, or null, between the sharp amplitude changes on either side of the null is the mismatch cylinder and the sensor, signals from these two points being in opposition. The present invention employs this characteristic portion of the echo signal at resonance to maintain the electrical input and the transmitted waves within a narrow band of frequencies which bracket the resonant frequency.

To this end, the echo signals detected by the coil 6 which result from transmitted signals at all frequencies are applied via conductors 8, 9 to an amplifier 10 which is so gated at 11 as to pass at its output only that portion of the echo signal within which the null point occurs at resonance. This gating is adjusted at the outset and is determined by the length of the transmission line and the sonic velocity of the material.

The output from the gate 11 will therefore, be either a null, (or a signal of very small amplitude), at (or near) resonance indicated at C or a substantial signal of substantial amplitude indicated at D at off resonance. An inverter 12 rectifies and inverts the gate output to provide the input for a monostable circuit 13 which incorporates an integrating capacitor circuit effective to integrate the input signals E or F so that at the output of circuit 13 appears either a falling dc voltage G or a rising dc voltage H according to whether the input to circuit 13 is present (at off resonance) or absent at resonance.

The changing voltage is applied to control an oscillator 14 having a frequency range 100 K c/s 150 c/s which fees the coil 6 of the transducer 3 through pulse transmitter 16.

In operation, once the equipment has been set up as described, the oscillator 14 is set to generate a pulse train at the lower frequency end of its range and echo signals received from the probe at that frequency will be appropriate to the off resonance condition. A signal of substantial amplitude appears in the gate and this is inverted and amplified to trigger the monostable circuit into producing a pulse train. The pulses from the latter are integrated and converted to a rising dc voltage H. This voltage is applied to control the oscillator 14 whose frequency thus rises. The frequency of pulses applied to the coil 5 thus increase with a corresponding increase in the frequency of elastic waves injected into the probe. When resonant frequency is reached, the echo pattern changes in the manner previously described, and indicated at B. The signal in the gate 11 diminishes rapidly as at D such that the output of the monostable circuit 14 falls. The corresponding dc voltage to the oscillator 14 also falls and the result is a fall in the frequency of the oscillator. This continues until the off (below) resonance signal occurs again when the systems readjusts itself to raise the pulse frequency once again to climb back into resonance. The output frequency of the oscillator is indicated in a digital voltmeter 15. A voltmeter 17 which indicates the voltage at the integrating capacitor in monostable circuit 13 may be read as a temperature reading direct once calibration of meter scale has been carried out.

Figure 2:
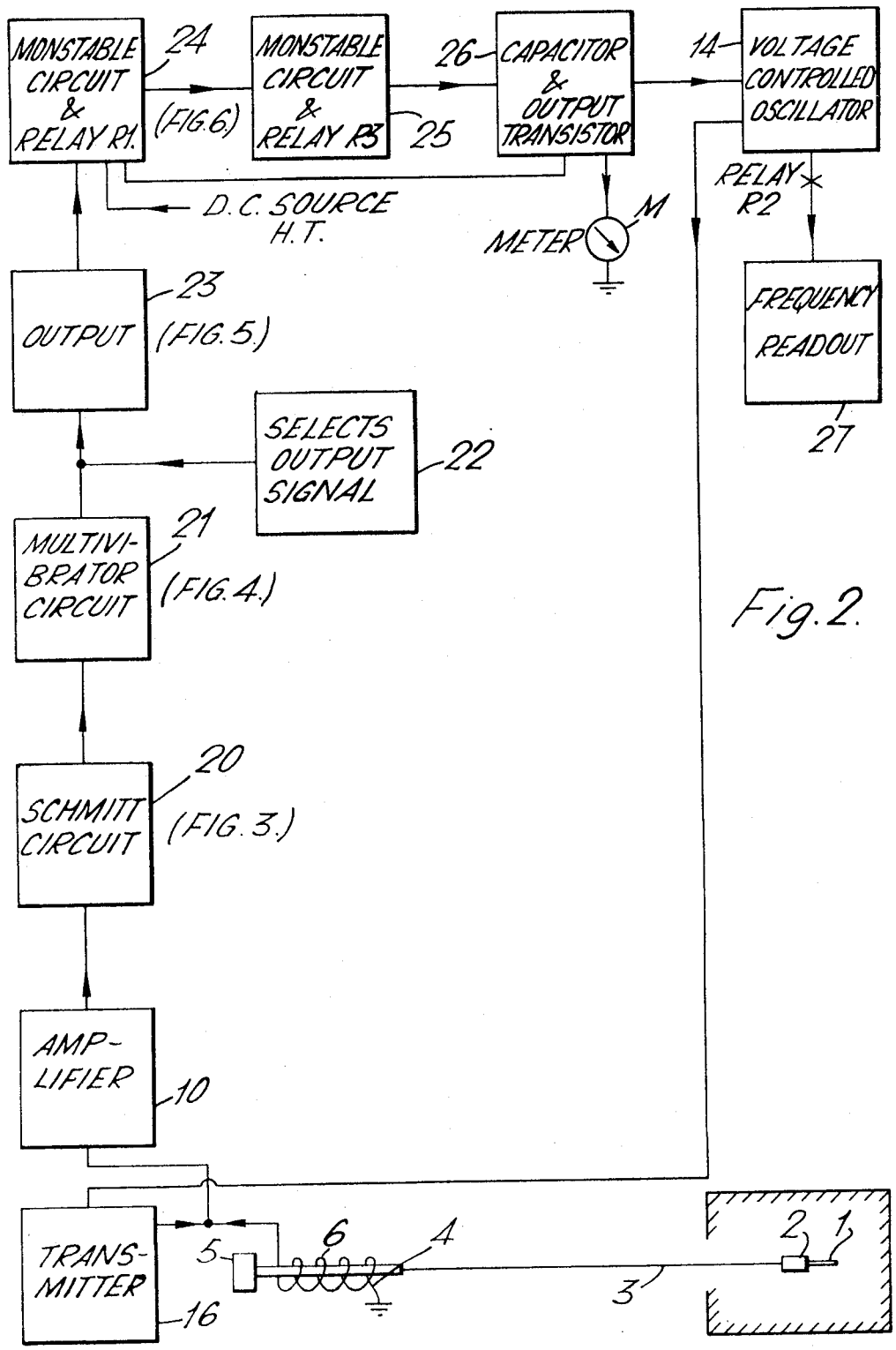
FIG. 2 is a diagram of a modified form of the invention and is also shown as block diagrams.

The embodiment described with reference to FIG. 1, whilst suitable in some applications can give rise to frequency hunting between the resonant and non resonant conditions. The embodiment of FIG. 2 aims to improve the performance of the system in this respect. In FIG. 2 the construction of the resonator 1, cylinder 2, transmission line 3, the voltage controlled oscillator 14, the transmitter 16 and amplifier 10 are similar to that shown in FIG. 1. However the amplifier output signal which takes either the form shown in FIG. 3a or 3b, according to whether the frequency of the transmitted pulses are at resonance or off resonance, are transmitted to trigger a Schmitt circuit 20 whose output is a train of square pulses. The pulse height of these pulses is uniform for each cycle of input signals.

At all frequencies other than the resonant frequency, the cycle of the Schmitt output pulse train is a discrete series of regularly spaced pulses as shown at FIG. 4b. At resonance, however, the discontinuity in the echo pulse signal FIG. 3a causes a gap to appear in the Schmitt circuit output train of pulses FIG. 4a.

The Schmitt circuit output pulses are applied to a multivibrator circuit 21 which under normal operating conditions runs freely at its own particular frequency but can be subdued by applied pulses and follows them. Thus, in FIG. 5b the heavily shaded pulses represent the normal pulse train output of the circuit 21. On application of the pulse cycles from the Schmitt circuit however the multivibration output is a correspondingly domineered pulse train of diminished amplitude FIG. 5b. In the resonant state, there is a gap in the pulse train and during the period of the gap the multivibrator runs freely (FIG. 5a) a pulse shown heavily shaded escaping through this gap. This pulse is extracted from the multivibrator 21 by selector 22 and is amplified and inverted in amplifier 23 whence it is used in the control system 24, 25, 26, for the oscillator 14 as described below.

The voltage controlled oscillator 14 receives its controlling voltage from a local dc supply indicated at HT in FIG. 7.

In FIG. 7 the HT line leads through relay controlled switch contacts $a$, $a^1$ of relay R1 to the base of transistor T1 which is connected in emitter follower mode. The oscillator 14, being connected to the emitter of transistor T1 runs at a frequency dependent upon the voltage appearing at the emitter, its frequency rising after the making of contacts $a$, $a^1$ with the rising voltage then applied. A high capacity condenser C is connected between contact $a^1$ and ground and a electrical path for partially shorting this condenser is afforded $vi_a$ a resistor $r$ under control of relay R3 whose contacts are normally open. The application of the controlling voltage to the oscillator can be interrupted by the opening of contacts $a$, $a^1$ and this is action is in fact performed by energization of relay R1 by a pulse FIG. 6a which appears at resonance only; the contacts $a$ and $b$ are then made and relay R2 is energized from the HT line. Once relay R2 is energized its contacts $c$, $d$ are made and the output of the oscillator is connected to a read out device, or meter, 27.

Meanwhile the condenser C, which has received a charge equal to that which drives the oscillator to resonance, stores its charge due the high input impedance presented by the transistor. This voltage is registered on the meter M and a corresponding oscillator frequency appears on the read out device 27.

The pulse obtained at resonance FIG. 6a controls the oscillator frequency through a series of relays and monostable circuits 24, 25, 26 (FIG. 2) the action of which is explained with reference to FIGS. 7 and 8. The pulse FIG. 6a is passed to monostable circuit 24 whose output is a pulse of 2 seconds period and this pulse is used to control the oscillator. This pulse is applied to operate relay R1 and switch its contact $a$ from contact $a^1$ (feeding the oscillator) to contact $b$. This has two effects, firstly, it isolates the capacitor C from the HT line and secondly it brings in relay R2 so making contacts $c$ $d$ and connecting the read out device 27 into circuit. These conditions obtain for the period of the pulse during which time the capacitor C, holds its charge owing to the high input impedance of the transducer T1 and the read out device indicates and/or records the frequency.

At the end of the two second period, the monostable circuit 24 restores to its former state and as it does so, the trailing edge of the pulse operates relay R3, via a further monostable circuit 25. The relay R3 operates to place a partial earth across the capacitor thus dropping its voltage and the oscillator 14 will now drop below resonant frequency. Hence the pulse condition shown in FIG. 6a will disappear and the FIG. 6b state is established. Hence relay R1 will restore to its condition making contacts $a$, $a^1$ and relay R2 will open. In consequence the oscillator will be reconnected to its HT line supply and the read out will be disconnected. The oscillator starts to sweep up its frequency band once more until resonance at the same or at a different frequency is reached.

Provision is made for an alternative form of read out and this takes the form of a meter M which responds to the capacitor voltage. This voltage is also available to operate a recorder if required.

I claim:

1. Apparatus for the monitoring of the resonant frequency of a body comprising an electric oscillator, a control device for controlling the frequency of said oscillator in response to an input signal, a transducer connected to said oscillator for delivering an output in the form of bursts of elastic waves whose frequency within the burst corresponds to that of the oscillator, a transmission line connected at one end thereof to the transducer output including a terminal portion at the other end thereof remote from the transducer, a body having a discrete resonant frequency associated with the terminal portion of said transmission line such that echos of bursts of elastic waves launched at said resonant frequency into said one end of the transmission line and transmitted back from said body contain a discontinuity and echos received from bursts of elastic waves at a non-resonant frequency are continuous within the burst, means for converting the echos of the bursts of elastic waves into electrical pulses, means for generating a continuous pulse train, means for comparing said electrical pulses with said continuous pulse train and for delivering an output pulse when a discontinuity in the burst of echo pulses occurs, and means for employing a pulse so delivered as an input signal to said control device to maintain the oscillator frequency at said resonant frequency.

2. Apparatus as claimed in claim 1 including a free-running multivibrator whose pulse output is suppressed by the electrical pulse train obtained from echos at nonresonant frequency, means for extracting a pulse or pulses from the multivibrator output when a discontinuity in the electrical pulse train occurs at resonance and means for employing the extracted pulse or pulses to control the frequency of the oscillator.

3. Apparatus as claimed in claim 1 in which the oscillator sweeps through a frequency band and means are provided for interrupting the frequency sweep when an extracted pulse appears.

4. Apparatus as claimed in claim 1 comprising a solid resonator, an acoustic transmission line for leading bursts of acoustic pulses to the resonator, a transducer for converting electrical pulses into acoustic waves and launching these waves into the transmission line, a voltage controlled oscillator for supplying the transducer, the oscillator having a frequency range which includes the natural frequency of vibration of the resonator, means for connecting the oscillator to a voltage source and means for interrupting the connection between oscillator and the voltage source in response to an echo signal from the resonator which is indicative of the resonant frequency.

5. Apparatus as claimed in claim 4 in which said connecting means comprises relay contacts included in the connection between the oscillator and the voltage source and means allowing the relay contacts to open in response to a signal derived from an echo at resonance in order to stop the oscillator at the resonant frequency.

6. Apparatus as claimed in claim 5 including means for reading out the frequency of the oscillator at which the voltage source is interrupted.

7. Apparatus as claimed in claim 6 including a means for reading out the value of the oscillator at the point at which the connection between the voltage source and the oscillator is interrupted.

* * * * *